United States Patent
Brown (10) Patent No.: US 7,030,760 B1
(45) Date of Patent: Apr. 18, 2006

(54) METHOD AND APPARATUS FOR ENSURING RELIABLE LOADING OF MATERIALS ON ARICRAFT AND OTHER VEHICLES

(75) Inventor: Suzy Brown, Encinitas, CA (US)

(73) Assignee: SeeControl, Inc., Menlo Park, CA (US)

( * ) Notice: Subject to any disclaimer, the term of this patent is extended or adjusted under 35 U.S.C. 154(b) by 125 days.

(21) Appl. No.: 10/213,455

(22) Filed: Aug. 5, 2002

Related U.S. Application Data (60) Provisional application No. 60/310,670, filed on Aug. 7, 2001.

(51) Int. Cl.
*G08B 13/14* (2006.01)

(52) U.S. Cl. .............................. 340/568.1; 340/572.7; 235/384

(58) Field of Classification Search ............. 340/568.1, 340/572.7, 572.8, 686.6, 686.5, 825.36, 825.49; 235/384, 385; 700/215, 217, 226; 343/872
See application file for complete search history.

(56) References Cited

U.S. PATENT DOCUMENTS

| | | | | |
|---|---|---|---|---|
| 3,695,462 A * | 10/1972 | Sullivan | ..................... | 414/273 |
| 4,776,464 A * | 10/1988 | Miller et al. | .................. | 209/3.3 |
| 4,975,696 A | 12/1990 | Salter, Jr. et al. | ........... | 340/973 |
| 5,051,565 A * | 9/1991 | Wolfram | ..................... | 235/384 |
| 5,225,990 A * | 7/1993 | Bunce et al. | ................ | 700/226 |
| 5,627,517 A * | 5/1997 | Theimer et al. | ......... | 340/572.1 |
| 5,842,555 A | 12/1998 | Gannon et al. | ............. | 198/358 |
| 5,911,688 A * | 6/1999 | Schaefer | ..................... | 600/302 |
| 5,933,098 A | 8/1999 | Haxton | ........................ | 340/945 |
| 6,002,344 A | 12/1999 | Bandy et al. | .......... | 340/825.54 |
| 6,097,301 A | 8/2000 | Tuttle | ........................ | 340/693.9 |
| 6,111,506 A * | 8/2000 | Yap et al. | ................. | 340/572.1 |
| 6,222,452 B1 | 4/2001 | Ahlstrom et al. | ........ | 340/572.1 |
| 6,232,877 B1 * | 5/2001 | Ashwin | .................... | 340/572.1 |
| 6,265,975 B1 * | 7/2001 | Zimmerman | ................ | 340/571 |
| 6,594,547 B1 * | 7/2003 | Manabe et al. | ............. | 700/227 |
| 6,698,653 B1 * | 3/2004 | Diamond et al. | ........... | 235/375 |

* cited by examiner

*Primary Examiner*—Phung T. Nguyen
(74) *Attorney, Agent, or Firm*—Blakely, Sokoloff, Taylor & Zafman LLP (57) ABSTRACT

A radio frequency identification (RFID) system includes an antenna located so that when baggage is being loaded on a vehicle, the antenna is capable of detecting information transmitted from at least one identity RFID tag located on the vehicle as well as information transmitted from a baggage RFID tag located on an item being loaded on or unloaded from the vehicle (though not necessarily simultaneously). A computer system is configured to compare the information transmitted from the identity RFID tag with expected vehicle information for the item loaded on or unloaded from the vehicle. An alarm condition may be generated if the results of the comparison indicate that the item is loaded on a vehicle other than that which was expected. The computer system may also provide notification to passengers or others regarding successful loading of the item on the vehicle. Similar processes may be used during unloading operations.

47 Claims, 7 Drawing Sheets

| Aircraft Identity Information | Luggage/Package Identity Information | Other Information from Luggage/Package RFID Tag |
|---|---|---|
| . . . | . . . | . . . |
| N-1234 | ABC1234 | John Doe;<br>notification tel. #: 123.555.1212;<br>flight AX123;<br>Confirmation # XX1XXX;<br>etc. |
| . . . | . . . | . . . |

METHOD AND APPARATUS FOR ENSURING RELIABLE LOADING OF MATERIALS ON ARICRAFT AND OTHER VEHICLES

RELATED APPLICATION

The present application is related to and hereby claims the priority benefit of Provisional Application No. 60/310,670, entitled "Method and Apparatus For Ensuring Reliable Loading of Materials on Aircraft and Other Vehicles", filed Aug. 7, 2001 by the present inventor.

FIELD OF THE INVENTION

The present invention relates to the field of remote locator systems, such as radio frequency identification (RFID) devices and corresponding transceiver systems, and the use of such systems in the monitoring, control and management of materials to provide real-time and near real-time information regarding the location and status of such materials.

BACKGROUND

Radio frequency identification (RFID) is an area of automatic identification that has been gaining favor among a variety of industry groups in recent years and is now generally recognized as a means of enhancing data handling processes, complimentary in many ways to other data capture technologies such as bar coding. A range of devices and associated systems are available to satisfy a broad range of applications. Despite this diversity, the principles upon which RFID is based are quite straight forward, even though the technology and technicalities concerning the way in which it operates can be quite sophisticated.

The object of any RFID system is to store data in one or more of a variety of transponders, commonly known as tags, and to retrieve this data, by machine-readable means, at a suitable time and place to satisfy particular application needs. Data within a tag may provide identification for an item in manufacture, goods in transit, a location, and/or the identity of an animal or individual. By including additional data the prospect is provided for supporting applications through item-specific information or instructions immediately available upon reading the tag. For example, the color of paint for a car body entering a paint spray area on a production line can be encoded in a tag for reading (and subsequent utilization) as the car body enters the painting area.

In addition to the tags themselves, an RFID system requires some means of reading or interrogating the tags (often called a "reader" although it generally includes some form of transmitter for interrogating the tags) and some means of communicating the data to a host computer or information management system. A system may also include a facility for entering or programming data into the tags, if the manufacturer does not undertake this operation at the source. Quite often an antenna is distinguished as if it were a separate part of an RFID system. While its importance justifies this attention, antennas are perhaps better viewed as features that are present in both readers and tags, essential for the communication between the two.

Communication of data between tags and a reader is by wireless communication. Two common methods distinguish and categorize RFID systems, one based upon close proximity electromagnetic or inductive coupling and one based upon propagating electromagnetic waves. Recently, capacitive coupling schemes have also been introduced. In any event, coupling is via the antenna structures described above and while the term antenna is generally considered more appropriate for propagating systems it is also loosely applied to inductive systems.

Figure 1A:
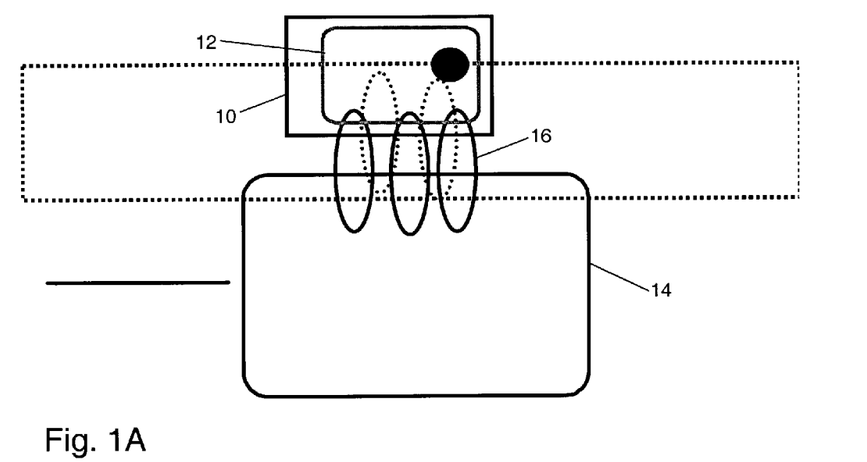
FIG. 1A illustrates the operation of a conventional passive RFID tag.

FIG. 1A illustrates a conventional RFID system that relies on inductive coupling to transmit stored information to a reader. As shown, the tag 10 is placed so that its antenna 12 is within a radio frequency (RF) field created by the reader's antenna 14. As a current is passed through the antenna 14, the RF field 16 is generated. The area of the RF field 16 will depend on the amount of current passed through antenna 14, the type of materials that are used to construct antenna 14, and the size and type of antenna 14 that is used. As the tag's antenna 12 passes through the RF field 16, a current is generated in the antenna 12 and that current is used to power the tag components, resulting in the stored data being transmitted. If the reader uses a time varying current within antenna 14, this process will occur even if the tag 10 is stationary. Because the tag 10 does not include its own power source to carry out transmissions of data, the tag is referred to as a passive RFID tag.

Figure 1B:
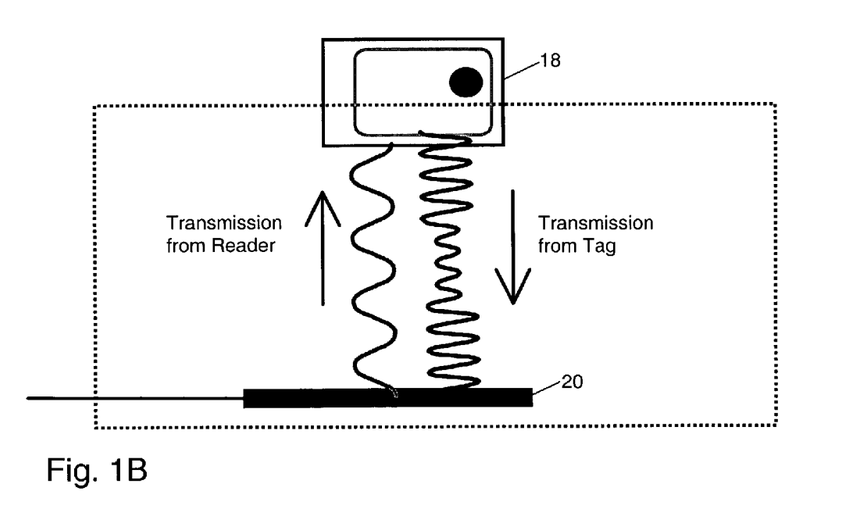
FIG. 1B illustrates the operation of a conventional active RFID tag.

FIG. 1B illustrates the use of an active tag 18, which allows for coupling through propagating electromagnetic waves. In this case, the tag 18 includes its own power source (e.g., a battery) which allows the tag to transmit its stored data to a reader antenna 20 directly, without having to rely on power generated from a radiated RF field. This allows for reading operations over extended ranges from that usually provided by passive tags that rely on inductive coupling.

To transfer data efficiently via the air that separates the two communicating antennas generally requires that the data be superimposed upon a carrier wave, as is common in the communication arts. This process is referred to as modulation, and various schemes are available for this purpose, each having particular attributes that favor their use. Commonly employed modulation techniques for RFID tags include amplitude shift keying (ASK), frequency shift keying (FSK) and phase shift keying (PSK). Common carrier frequencies include high frequencies (HF, approximately 3–30 MHz), very high frequencies (VHF, approximately 30–300 Mhz) and ultra high frequencies (UHF, frequencies above 300 MHz). Higher carrier frequencies allow for faster data rates, but are generally limited to line-of-sight applications. Commonly used commercial RFID systems operate at 13.56 MHz, while others operate at 915 MHz.

Figure 2:
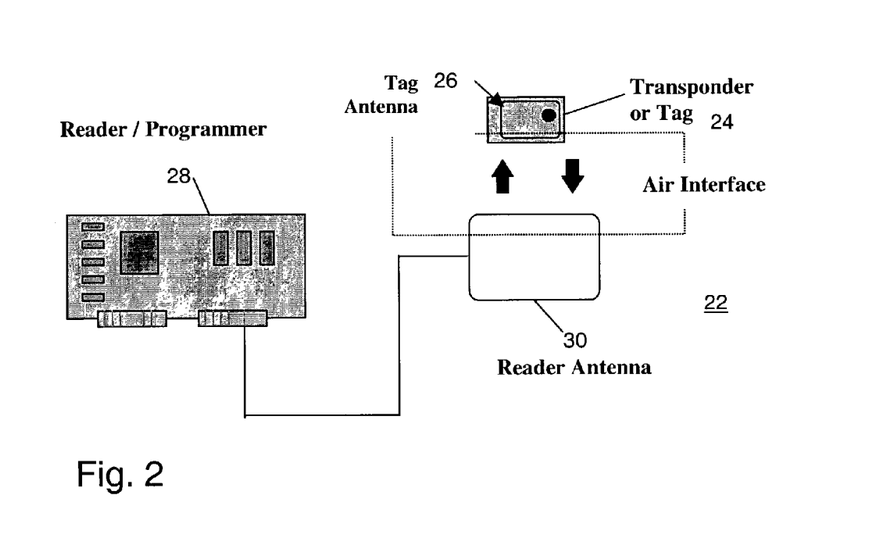
FIG. 2 illustrates the components of a conventional RFID system.

Having looked at some of the basics behind RFID technology, we turn now to some further details regarding the components that make up a conventional system. FIG. 2 illustrates an example of a conventional RFID system 22 that includes a transponder or tag 24 (which may be of the active or passive variety) with an antenna 26, and a reader/programmer 28 with an antenna 30. The word transponder, derived from the combination of TRANSmitter and resPONDER, reveals the function of the device. The tag 24 responds to a transmitted or communicated request for the data it stores by communicating information by wireless means across the space or air interface between the tag and the reader. The term also suggests the essential components that form an RFID system—tags and a reader or interrogator. Where interrogator is often used as an alternative to the term reader, a difference is sometime drawn on the basis of a reader together with a decoder and interface forming the interrogator.

Figure 3:
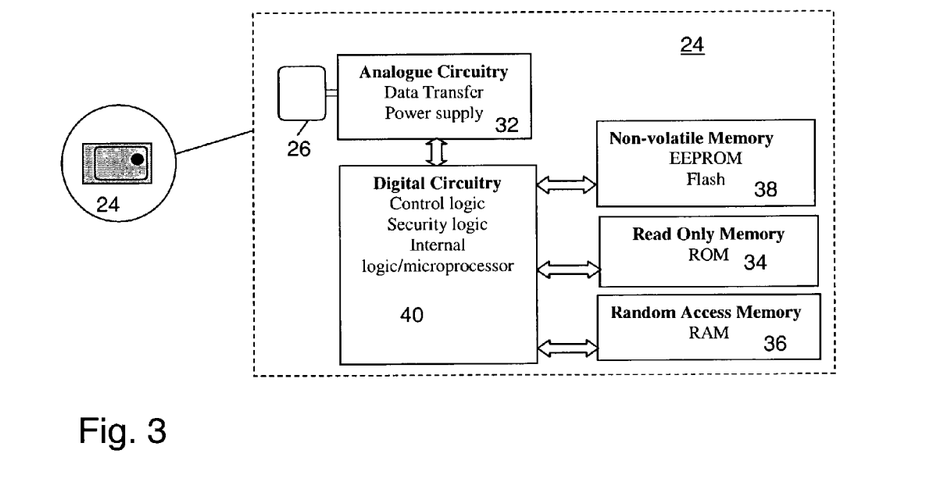
FIG. 3 illustrates in detail the components of a conventional RFID tag.

The basic components of tag 24 are shown in FIG. 3. Generally speaking tags are fabricated as low power integrated circuits suitable for interfacing to external coils (i.e., antennas 26), or utilizing "coil-on-chip" technology, for data transfer and power generation (passive mode). Some analog circuitry 32 is generally included for these purposes. In addition, the tag may include a read-only memory (ROM) 34, random access memory (RAM) 36 and/or non-volatile programmable memory (often a form of Flash memory) 38 for data storage depending upon the type and sophistication of the device.

The ROM-based memory 34 is used to accommodate security data and the transponder operating system instructions which, in conjunction with the processor or processing logic 40, deals with the internal "house-keeping" functions such as response delay timing, data flow control and power supply switching. The RAM-based memory 36 may be used to facilitate temporary data storage during transponder interrogation and response. The non-volatile programmable memory 38 may take various forms, electrically erasable programmable read only memory (EEPROM) being typical. It is used to store the transponder data and needs to be non-volatile to ensure that the data is retained when the device is in its quiescent or power-saving "sleep" state.

Various data buffers (which are created in the volatile memory 36) may be used to temporarily hold incoming data following demodulation and outgoing data for modulation and interface with the tag antenna 26 (which itself is used to sense the interrogating field and, where appropriate, the programming field, and also serves as the means of transmitting the tag response to the interrogator). The interface circuitry 32 provides the facility to direct and accommodate the interrogation field energy for powering purposes in passive transponders and triggering of the tag response. Where programming is accommodated, facilities must be provided to accept the incoming data modulated signal and perform the necessary demodulation and data transfer processes.

RFID tags such as tag 24 come in a wide variety of physical forms, shapes and sizes. Animal tracking tags, inserted beneath the skin, can be as small as a pencil lead in diameter and ten millimeters or so in length. Tags can be screw-shaped to identify trees or wooden items, or credit card shaped for use in access applications (e.g., identity badges). The anti-theft hard plastic tags attached to merchandise in stores are a form of RFID tag, as are the heavy-duty rectangular transponders used to track inter-modal containers, or heavy machinery, trucks, and railroad cars for maintenance and tracking applications.

Returning to FIG. 2, the reader/interrogator 28 can differ quite considerably in complexity, depending upon the type of tags being supported and the functions to be fulfilled. However, the overall function is to provide the means of communicating with the tags 24 and facilitating data transfer (a process generally known as "scanning"). Functions performed by the reader 28 may include quite sophisticated signal conditioning, parity error checking and correction. Once the signal from a tag 24 has been correctly received and decoded, algorithms may be applied to decide whether the signal is a repeat transmission, and may then instruct the transponder to cease transmitting. This is known as the "Command Response Protocol" and is used to circumvent the problem of reading multiple tags in a short amount of time. Using interrogators in this way is sometimes referred to as "Hands Down Polling". An alternative, more secure, but slower tag polling technique is called "Hands Up Polling", which involves the interrogator looking for tags with specific identities, and interrogating them in turn. This and other contention management techniques have been developed to improve the process of batch reading. A further approach may use multiple readers, multiplexed into one interrogator, but with attendant increases in costs.

Transponder programmers are the means by which data is delivered to tags capable of being programmed/reprogrammed. Programming is generally carried out off-line, at the beginning of a batch production run, for example. However, in some systems reprogramming may be carried out on-line, particularly if a tag is being used as an interactive portable data file within a production environment, for example. By combining the functions of a reader/interrogator and a programmer into a single unit 28, data may be read and appended or altered in the tag 24 as required.

Potential applications for RFID are many and varied. The attributes of RFID are complimentary to other data capture technologies and thus able to satisfy particular application requirements that cannot be adequately accommodate by alternative technologies. Principal areas of application for RFID that can be currently identified include: transportation and logistics, manufacturing and processing, and security. A range of miscellaneous applications may also be distinguished, some of which are steadily growing in terms of application numbers. They include: animal tagging, waste management, time and attendance, postal tracking, and road toll management. As standards emerge, technology develops still further, and cost reduction has spawned considerable growth in terms of application numbers.

One field that has received some attention in the RFID arena is that of airline baggage handling. As any frequent traveler will recognize, the problem of ensuring that airline baggage is placed on the correct aircraft to meet its intended recipient at the end of a journey is still one that has yet to be satisfactorily addressed by the airline operators. Moreover, new security regulations imposed by the U.S. and other governments require that airlines ensure that a passengers baggage only be placed aboard an aircraft if the passenger him/herself boards. Although some schemes to address these problems have identified the desirability of using RFID tags, to date no scheme has been developed that can ensure, with a high degree of accuracy, that a piece of baggage or other cargo has actually been placed aboard the correct or intended aircraft.

For example, U.S. Pat. No. 6,222,452 to Ahlstrom and Johansson proposes a scheme wherein the movements of passengers and luggage are tracked through the use of RFID tags. In this scheme, when a passenger presents him/herself for check-in, an RFID tag is attached to the passenger's luggage to be checked. The RFID tag is encoded with the passenger's information (such as itinerary information). A similar RFID tag may be included in the passenger's boarding pass.

The passenger and his/her luggage then proceed toward the aircraft in the conventional fashion, with the luggage tag and boarding pass tag being "scanned" at various locations within the terminal (e.g., along luggage conveyor belts and at security checkpoints). Each time the passenger's boarding pass or luggage identification tag is scanned, an identification signal is transmitted to a central computer system for further processing. In this way, luggage and passengers can be correlated to one another.

Although the scheme proposed by Ahlstrom and Johansson may allow for detecting when a passenger whose luggage is placed on an aircraft does not him/herself board the aircraft, it does not provide any enhancement over the conventional methods of ensuring that luggage is actually placed on the aircraft for which it is intended. Stated differently, there is no mechanism (other than manual baggage handling procedures) for determining whether a piece of luggage has been placed aboard the correct aircraft.

U.S. Pat. No. 6,097,301 to Tuttle describes a scheme for using RFID tags with aircraft luggage wherein a human operator uses a wearable interrogator to obtain information regarding the pieces of luggage s/he is sorting. In this scheme, the two-way communication range between the interrogator transceiver and the tag transceiver is adjusted to only slightly exceed the closest distance between the interrogator and the tag while the operator is handling the tagged object. Preferably, the range is short enough that other tagged objects will remain outside the communication range and so will not respond to messages from the interrogator. In this way, false reads are purportedly reduced. By using similar interrogators at destination and arrival cities, the location of various baggage items can be determined. However, this scheme cannot ensure the reliable placing of a particular item of baggage on a specific aircraft because it relies on conventional manual baggage handling procedures.

U.S. Pat. No. 6,002,344 to Bandy et al. proposes a scheme for inventorying a number of RFID tags with permanent identification numbers to guard against time slot contention, but offers no suggestions for the problem at hand: Namely, ensuring that luggage finds its way onboard the proper aircraft or other transportation vehicle.

U.S. Pat. No. 5,933,098 to Haxton describes a security scheme wherein a system of scanners and transponders installed in an airport provide the ability to match a passenger with his or her baggage. At the baggage check-in counter, airline personnel issue conventional bar coded tags, which are subsequently attached to a passenger's baggage. This data is uploaded to a central computer. The passenger is also issued a boarding pass with a similar bar code. A bar code scanner located onboard the aircraft is then used to scan each boarding pass and the information therefrom is transmitted to the central computer to indicate that the passenger has boarded the aircraft. Baggage placed in containers for shipping on the flight is scanned in a similar fashion. Then, after all passengers are onboard and the aircraft doors closed, a boarding complete signal would be transmitted to the central computer. This signals a program in the computer to run a simple compare routine for each passenger and his or her baggage. If the compare program indicates that a passenger failed to board the aircraft, an alarm is automatically generated.

This system is similar to ones currently in use and as experience has demonstrated it does not provide a reliable means for ensuring that luggage is placed on the proper aircraft. Further, because of the manually intensive scanning processes involved, it is rather time consuming. In short, it does not address the needs of today's airlines and passengers.

U.S. Pat. No. 5,911,688 to Schaefe proposes that an RFID tag be fastened to each piece of baggage so that when the baggage item is checked by a traveler at an airport, identification information corresponding to a code printed on the traveler's boarding pass is stored in the tag. The traveler then proceeds to the gate of his flight, where the code printed on his boarding pass is read. The RFID tag transmits stored identification information, so that the baggage item is loaded onto the aircraft only when the code printed on the boarding pass has been read at the gate. In so far as this scheme proposes the use of active tags, it likely would not pass scrutiny under regulations governing the use of electronic devices in aircraft. Further, it does not ensure that the correct baggage is loaded aboard the correct aircraft.

U.S. Pat. No. 5,842,555 to Gannon and Graves proposes an automated baggage tracking and sorting system having a conveyor system controlled by a system controller, and a distributed baggage identification system. The distributed baggage identification system includes a number of zone content identifiers (RFID tags) coupled to one or more conveyors at predetermined locations to create a number of zones. Each of the zones is associated with one of zone content identifiers, and each of the zone content identifiers is configured to store information pertaining to the object located in the associated zone.

A number of information retrievers positioned adjacent to the conveyors at predetermined transition regions are configured to retrieve information from the zone content identifiers as the associated zone is at a transition region. A system controller utilizes the zone content information for identifying and tracking baggage traveling through the conveyor system. The system controller also transmits control commands to the conveyor system in accordance with routing decisions based upon the contents of the conveyor system zones.

Notably, although this system can be used to track baggage within a terminal, it does not provide for ensuring the delivery of that baggage to a designated aircraft. Nor does it provide for correlating baggage information with passenger information.

Other schemes including photograph and/or fingerprint identification schemes have addressed the need to match a passenger with his or her baggage and/or ticket, but for the most part these proposals have not addressed the problem of ensuring that baggage is placed aboard the correct aircraft.

SUMMARY OF THE INVENTION

A radio frequency identification (RFID) system includes one or more antennas coupled to an interrogator associated with a baggage loading/unloading device. At least one of the antennas is located at a position on the loading/unloading device so that when baggage is being loaded to or unloaded from an adjacent vehicle the antenna is capable of detecting information transmitted from at least one identity RFID tag located on the vehicle being loaded or unloaded.

As used herein, the term vehicle should be understood to refer to any type of transportation device, including an aircraft, an automobile or truck, a train, a ship, etc. In addition, containers, such as those used by large aircraft or ships (e.g., universal loading devices or APL containers) may also be regarded as vehicles for smaller items within the context of this description. Even buildings may be regarded as vehicles where, for example, the building is used as a cross-dock during shipping operations for temporarily storing goods.

Another, or even the same, antenna may be positioned on the loading/unloading device so that when baggage is being loaded or unloaded from the adjacent vehicle, this antenna is capable of detecting information transmitted from a baggage RFID tag located on an item being loaded on or unloaded from the vehicle. The term baggage (and similar terms), as used herein, should be understood as meaning any item being loaded or unloaded from a vehicle. Thus, baggage may encompass not only individual luggage items, but also packages and other items. Also, shipping containers, such as those discussed above, into which smaller items are placed for transport may also be baggage items as discussed herein. Consequently, depending on the context of the discussion, a shipping container may be a baggage item (as when the container is being loaded on a ship. Aircraft or truck, for example), or a vehicle (as when smaller individual items, such as luggage items, for example, are being loaded into the container for shipment).

Preferably, though not necessarily, the RFID tag located on the vehicle is a passive RFID tag. Usually, the RFID tag located on the item being loaded on or unloaded from the vehicle is a passive RFID tag.

A computer system may be coupled (e.g., using a wireless communication link) to receive and store the information transmitted from the identity RFID tag located on the vehicle together with the information transmitted from the baggage RFID tag in a computer-readable medium. In some cases, the computer system may be associated with the interrogator, while in other cases it may be a separate computer system. In either case, the computer system is configured to compare the information transmitted from the identity RFID tag with expected vehicle information for the item loaded on or unloaded from the vehicle. An alarm condition may be generated if the results of the comparison indicate that the item is loaded on a vehicle other than that which was expected.

The expected vehicle information may be received from the baggage RFID tag located on the item, from a database accessible to the computer system or from another system/ location. In some cases, this information is stored at the time when the item is received during a check-in procedure (e.g., at an airport baggage check-in counter).

The computer system may be further configured to notify a designated party (e.g., a passenger, an airline official or some other party) of successful loading or unloading of the item on/from the vehicle if the expected vehicle information matches the information transmitted from the identity RFID tag. The computer system may be configured to make this notification using notification information received from the baggage RFID tag. In such cases, the notification information may be at least one of: a telephone number, a pager number, or an e-mail address.

The computer system may be further configured to provide information regarding successful loading of the item on the vehicle to an onboard information system of the vehicle. Where the vehicle is an aircraft, this may be an onboard video entertainment system or similar system.

Furthermore, the computer system may be further configured to compare passenger boarding information with the information received from the baggage RFID tag. An alarm condition may be generated if the passenger boarding information reveals that a passenger associated with the item has not boarded the vehicle prior to the expiration of an allocated boarding period.

A further embodiment provides a computer-implemented method for comparing identity information received from an RFID tag affixed to a vehicle with expected vehicle information indicating the vehicle on/from which an item (e.g., luggage) was to have been loaded/unloaded and generating an alarm condition or not, according to the outcome of the comparison. The RFID tag affixed to the vehicle may be a passive (or in some cases an active) RFID tag. The identity information may be one or more of: vehicle registration information, or vehicle flight number information (e.g., if the vehicle is an aircraft).

In some cases, the expected vehicle information is received from a baggage RFID tag affixed to the item. Such information may be stored at the time the item is checked-in (e.g., as in the case of baggage to be loaded on an aircraft). The expected vehicle information may be stored in the baggage RFID tag affixed to the luggage; which may also store passenger notification information, such as a telephone number, a pager number or an e-mail address. Where such information is available, a notification message may be transmitted to a location identified by the passenger notification information upon a successful match between the expected vehicle information and the information received from the RFID tag affixed to the vehicle.

Another embodiment provides an aircraft that includes a fuselage having a door area therein and one or more RFID tags storing identity information for the aircraft affixed to the aircraft in the vicinity of the door area. The identity information may be one or more of: aircraft registration information or flight number information. The one or more RFID tags may be passive (or even active) RFID tags.

Yet another embodiment provides a baggage cart that includes a conveyor belt and an antenna configured for use with an RFID system affixed to the baggage cart in an area near one end of the conveyor belt and situated so as to be capable of scanning RFID tags affixed to vehicles to which baggage will be loaded or from which baggage will be unloaded using the baggage cart. That is, the RFID tags may be attached directly to the vehicle so as to provide a source of vehicle identification information that can be easily accessed during loading or unloading operations. The RFID system may include an RFID interrogator (or an interrogator/programmer) coupled to the antenna. A radio system may be coupled to the interrogator (e.g., for transmitting scanned information to other locations/systems).

BRIEF DESCRIPTION OF THE DRAWINGS

The present invention is illustrated by way of example, and not limitation, in the figures of the accompanying drawings in which.

DETAILED DESCRIPTION

Described herein is a scheme for ensuring the reliable loading/unloading of baggage and other materials on/from aircraft and other vehicles. Systems configured in accordance with the present invention are similar to remote locator systems that use RFID tags and interrogators to monitor, control and manage the transport of materials to provide real-time and near real-time information regarding the location and status of such materials. However, unlike the prior systems discussed above, the present invention incorporates means for determining which aircraft or other vehicle the materials are actually loaded on, so as to ensure proper routing of those materials to their intended destination.

Systems configured in accordance with the present invention may also make use of systems designed to determine and/or control the passenger boarding process so as to ensure that passenger baggage is loaded onboard an aircraft or other vehicle only if the passenger him/herself also boards. Furthermore, the present system provides means for informing passengers of the status of their checked baggage (i.e., confirmation that the baggage has been loaded onboard the correct aircraft or other vehicle) though the use of handheld communication devices such as wireless telephones, pagers, personal digital assistants and the like, and/or on-board information display systems. Similarly, airline and other third party logistics personnel can be provided with up-to-date information regarding the status of packages and other items so as to ensure proper "next flight out" and other rapid or guaranteed delivery services.

Although discussed with reference to the example of an aircraft loading/unloading process, the present invention is equally applicable to any of a variety of situations where baggage and/or persons are embarked on a vehicle for transport from one area to another. Therefore, the use of the term aircraft or similar terms (e.g., vehicle) herein should not be read as being limited to this application but should instead be read as encompassing any transportation system or vehicle that employs similar loading and/or unloading procedures, such as automobiles, trucks, ships, trains and the like. Indeed, as noted above, containers (such as universal loading devices or APL shipping containers) may be regarded as vehicles for purposes of the present invention. Also, buildings may be "vehicles" such as when the items being shipped are temporarily stored in a building during shipping and one wishes to keep track of the movement of goods through such buildings. Likewise, the terms luggage or baggage (or similar terms) should not be read as being restricted to individual suitcases and like items, but may instead refer to any type of item, including containers that hold multiple luggage items or packages (or the like). Indeed, for many large vehicles (e.g., ships, large aircraft, etc.), smaller baggage items are placed into larger baggage items (such as containers) before being loaded. Thus, the "vehicle" for the smaller items is the container, while the "vehicle" for the containers is the aircraft or ship, etc. All of these scenarios are contemplated as being within the scope of the present invention.

In addition, the examples of RFID systems discussed herein should be understood as being just that, examples only, and should not be read as restricting the broader scope of the present invention. The reason for using and discussing the examples herein is to provide the reader with an easy to understand application in which the present invention may find use. Readers will understand that it would be overly tedious and unnecessary to explain in detail or even list each and every possible application and/or configuration of the present invention, in part because such a list would not significantly contribute to the communication of the central ideas which make up the present invention and, besides, these broad concepts are described and encompassed in the claims which follow this description.

Some portions of this detailed description are presented in terms of algorithms and/or symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 4:
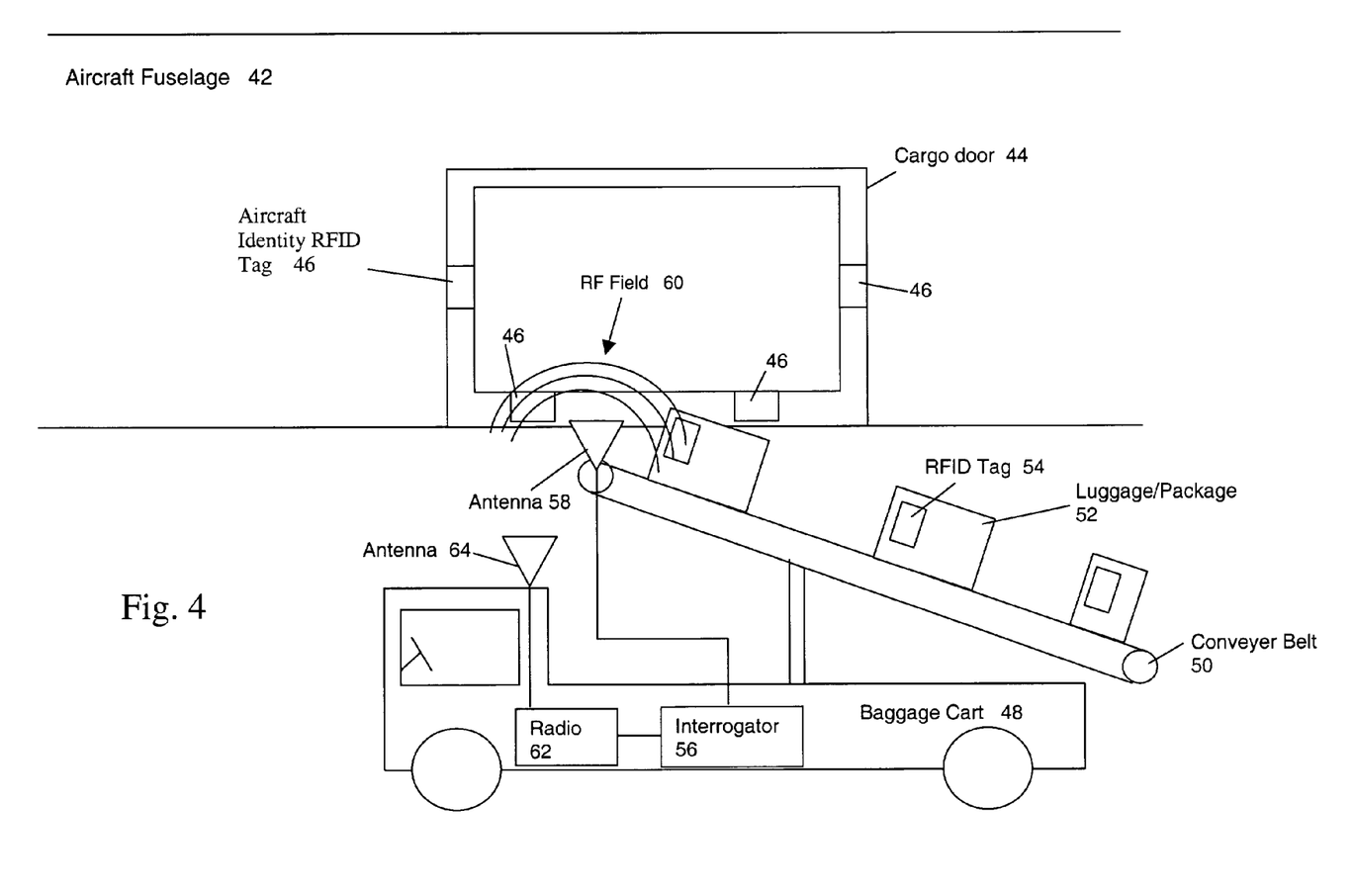
FIG. 4 illustrates an example of an RFID system configured in accordance with an embodiment of the present invention for use during aircraft loading and/or unloading operations.

Referring now to FIG. 4, an RFID system configured in accordance with one embodiment of the present invention is illustrated. In this example of the use of the present invention, a aircraft is being loaded with luggage and/or other packages and the goal is to ensure that the correct luggage/packages are being placed aboard the correct aircraft. The aircraft fuselage 42 includes one or more cargo doors 44, which are open to receive the luggage to be loaded. In accordance with the present invention, one or more RFID tags 46 are attached (e.g., using adhesive or other fastening materials (e.g., Velcro fasteners) to the interior of the cargo door 42 or in another area on the fuselage 42 in close proximity thereto. RFID tags 46 are preferably passive tags, however, in some embodiments active tags could be used provided they are turned off or removed from the aircraft prior to flight operations. These RFID tags 46 are programmed with the aircraft's identity information (e.g., aircraft registration number and/or flight number) prior to commencing the luggage loading operations. This programming may be carried out using a conventional RFID programmer in the manner described above. In addition to the aircraft identity information, other information such as the aircraft's flight schedule could be programmed into the tags 46.

The present RFID system also makes use of a baggage cart 48. This is a conventional baggage cart or other vehicle fitted with a conveyer belt 50 that is used to lift luggage and other packages 52 from the tarmac to the aircraft's cargo door 44. Any conventional vehicle of this type may be fitted with the components of the RFID system described herein and the precise nature of the baggage cart or vehicle is not critical to the present invention. For example, many large aircraft make use of so-called Universal Loading Devices (ULDs). These are essentially large containers that are individually loaded with baggage and other items and the containers are then loaded onboard the aircraft using hydraulic loading devices, not conveyor belts. It should be appreciated that the discussion of baggage and other packages along with conveyor-type loading devices herein applies equally well to these ULDs and their associated loading devices.

Each item of luggage or package 52 includes an RFID tag 54 attached thereto. In the case of a piece of luggage, these tags 54 may be used in place of or in addition to conventional bar coded luggage tags that are issued by airline personnel when passengers check-in. These tags 54 are preferably passive RFID tags so that no RF emissions emanate from the tags when not in the presence of an RF field from an interrogator antenna. That way, no RF emissions from the tags will interfere with flight operations once the baggage has been loaded onboard the aircraft.

The tags 54 associated with the pieces of luggage or other packages 52 may have been scanned at various points throughout their journey from the passenger check-in area through the airport terminal baggage handling system, as described in several of the above-referenced patents. In this way, baggage may be delivered to an appropriate loading area and/or loading vehicle (e.g., baggage cart 48). The present invention solves the "last mile" problem of ensuring that the right bags are placed onboard the correct aircraft. To do so, the baggage cart 48 is fitted with an RFID interrogator 56 that is connected to one or more antennas 58. These components may be conventional in nature, but the use of one or more antennas 58 in an area near the top of the conveyor belt 50 of the baggage cart 48 is new.

By positioning one or more antennas 58 on baggage cart 48 so that during baggage loading/unloading operations the antenna(s) 58 is/are near the cargo door 44, the RF field 60 generated by the antenna(s) 58 encompasses not only the area of the top of the conveyor belt 50 where the luggage and other packages 52 are removed for loading into the aircraft, but also the surrounding area so that one or more of the aircraft identity RFID tags 46 is also within the field 60. In this way, as each item of luggage 52 is loaded into the aircraft, its corresponding RFID tag 54 will be scanned and information regarding the baggage that was encoded in the tag 54 at the time of check-in (or in the case of a package that was encoded at the time the package was received and accepted by airline personnel for shipment) is reported to the interrogator 56. In addition, the aircraft identity RFID tag 46 is scanned (either per luggage item or periodically (or even just once) during the loading process) so that aircraft identity information can be associated with the baggage information at the time the baggage is loaded onboard the aircraft.

In some cases, separate antennas 58 may be used. For example, an antenna that is used to read the aircraft identity RFID tag 46, may be different than the antenna(s) used to read the luggage RFID tags 54. This may be useful where directional antennas are needed to ensure accurate reading of the aircraft RFID tags 46.

As an example of this process, assume that the aircraft identity RFID tags 46 store the aircraft registration number "N-1234". Further assume that as each item of luggage 52 is checked in by a passenger, the luggage item receives a baggage tag with an RFID tag that stores information such as the passenger's name, flight information such as the flight number and the departure and arrival airport codes (including any in-transit airports where a change in aircraft is involved), and a sequentially issued serial number (e.g., ABC1234). IN addition, passenger notification information (such as a cellular or other wireless telephone number, pager number, etc.) may be encoded on the tag. This type of information may be used for the passenger notification procedures described below. Of course, these are just examples of the types of information that may be encoded in tags 46 and 54 and in other embodiments different information may be encoded in addition to or in place of the types of information described above. It is sufficient for purposes of the present invention if RFID tag 46 stores information that may be used to uniquely identify the aircraft while each luggage RFID tag 54 stores information sufficient to uniquely identify a piece of luggage.

Figure 5:
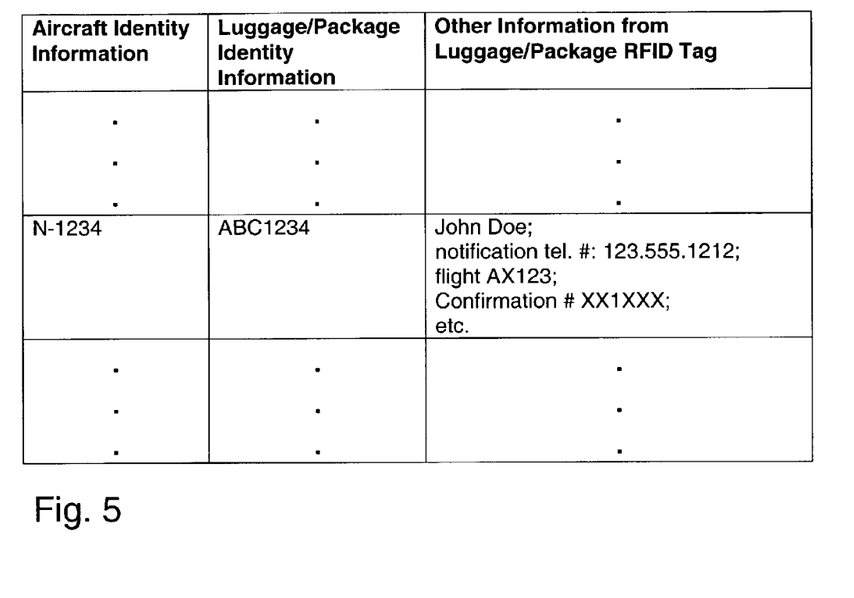
FIG. 5 illustrates an example of a table for storing aircraft and baggage/package identity information (as well as other information such as passenger identity and notification information) which may be stored in a memory system of computer system (and/or an RFID reader/interrogator) configured for use in accordance with an embodiment of the present invention.

Carrying on with the above example, when the piece of luggage with serial number ABC1234 encoded in its RFID tag 54 is loaded onto the aircraft, the tag will be scanned as it passes within the RF field 60 and, as a result, the interrogator 56 will read the luggage serial number ABC1234 (and any other information stored in the tag). In addition, the interrogator 56 will read the aircraft identity information (N-1234) stored in tag 46 and this aircraft information will be associated with the luggage serial number information and stored in memory at the interrogator 56. An example of a table for storing such information is shown in FIG. 5. This information may be subsequently relayed to one or more locations remote from the aircraft and baggage cart, either using a wireless communication system (e.g., including radio 62 and antenna 64) or by downloading the stored information from interrogator 56 to a computer system once the baggage loading operations have been completed. Alternatively, the operations described below for comparing the loaded baggage information to expected information and/or passenger information may all be carried out at the baggage cart 48 using an on-board computer system associated with interrogator 56 so that any alarm conditions and subsequent corrective action (e.g., removing baggage improperly loaded on the wrong aircraft or removing baggage of passengers that have not boarded) may be noted and carried out quickly and in the vicinity of the loading area.

Assuming that the wireless communication method is employed, the stored baggage/aircraft information collected as a result of the above-described scanning operations is relayed using conventional wireless communication techniques using a one-way or two-way radio 62 that is fitted on the baggage cart 48. Many conventional baggage carts of this type are fitted with two-way radios to allow for operating crew voice communication with operations personnel at the airport. These radios may be adapted for data communication purposes to accommodate the transmission of the data information from the interrogator 56 or, alternatively, a different radio set adapted for data communication may be used. It will be appreciated that radios 62 may include a modem to allow for the data transmissions of the types described herein. The precise configuration of the radio system 62 is not, however, critical to the present invention.

Figure 6:
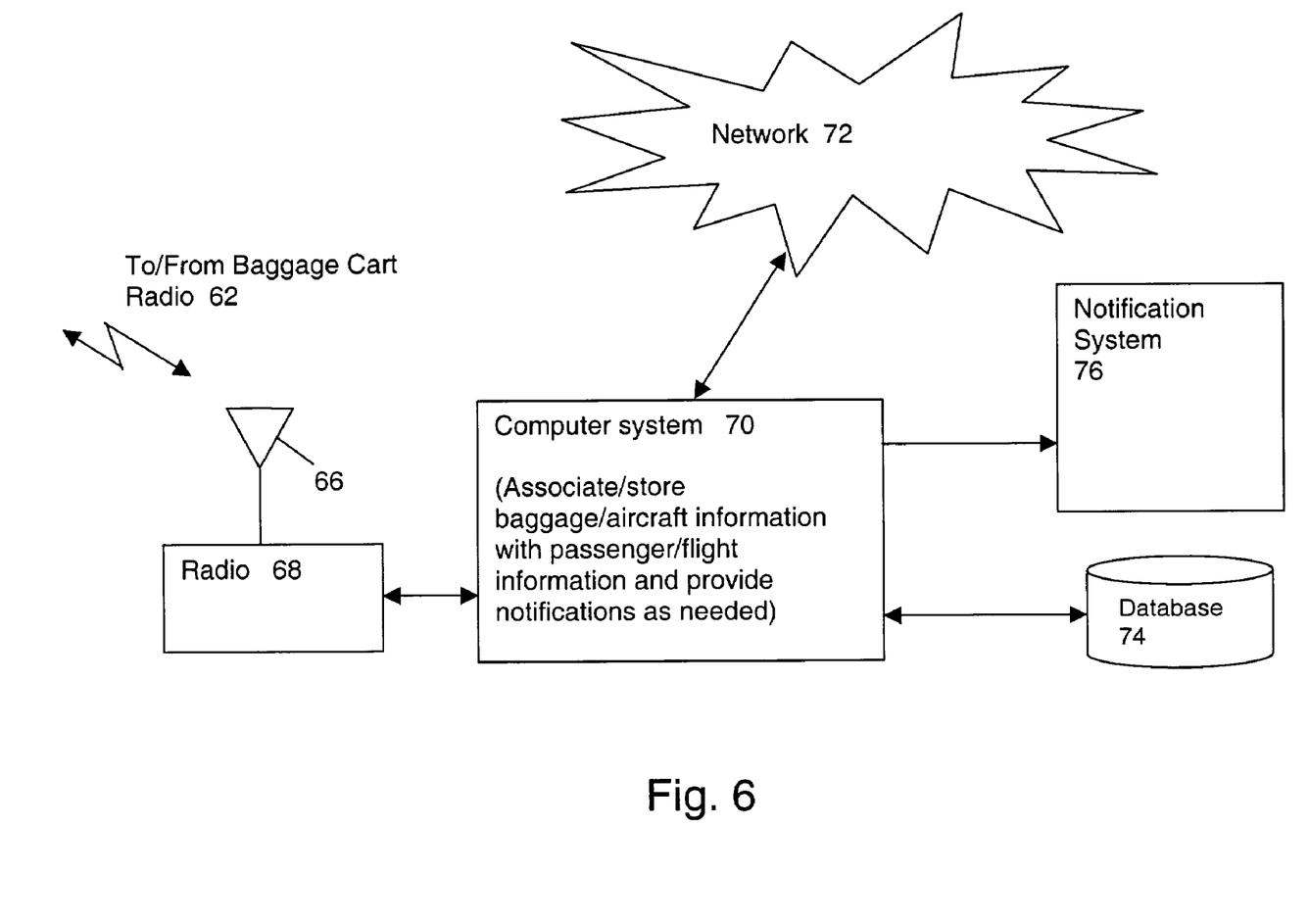
FIG. 6 illustrates an example of a computer system configured for use in accordance with an embodiment of the present invention for receiving and processing baggage loading/unloading information.

Turning now to FIG. 6, a system for receiving and making use of the information transmitted by radio 62 is shown. Signals transmitted from radio 62 are received by antenna 66 and provided to radio 68. The exact configuration of radio 68 is not critical to the present invention, but it must be capable of at least receiving and demodulating signals from radio 62. Therefore, it is likely (though not required) that radio 68 will include a receiver and a modem. In addition, to allow for two-way communication with radio 62 (e.g., to provide instructions to interrogator 56 to transmit its stored information and/or to provide information to interrogator 56 for use in programming one or more RFID tags if interrogator 56 also includes programming capabilities, etc.), radio 68 may include a transmitter. Communication between radios 62 and 68 may be full-duplex or half-duplex depending upon the type of communication protocol employed. This is not critical to the present invention.

The information (preferably in demodulated form) received by radio 68 is provided to computer system 70, which may also be coupled to a computer network, or network of networks such as the Internet, 72. One role of computer system 70 (which may be a conventional personal computer configured with appropriate software) is to store the baggage/aircraft information received from radio 62 in a database 74. This may be a local database (e.g., on a hard drive or other local storage medium of the computer system) or it may be a remote database accessible by other computer systems (e.g., airline computer systems that need to store and retrieve flight information including the baggage status information). In addition, computer system 70 may provide for correlating passenger status information (e.g., whether a passenger has boarded an aircraft) with the baggage status information so as to ensure that only passengers who actually board an aircraft have their baggage loaded on the aircraft.

The passenger status information may be collected using boarding passes or cards (with or without RFID tags) that are scanned as passengers are embarked onto the aircraft in the conventional fashion. This information may be passed to computer system 70 through network 72. The passenger status information is then matched with the baggage information either by matching passenger name information that has been read from the baggage RFID tags 54 and relayed from radio 62 or by using information stored in database 74 that correlates passenger name with baggage serial number information. Such information may be stored in database 74 at the time of passenger check-in, as the RFID baggage tags 54 and passenger boarding passes are issued.

Regardless of how the information is collected, computer system 70 will match up passenger status information with baggage status information. In addition, the passenger status information collected at the time of boarding will include the flight number and/or aircraft registration number for the aircraft being boarded. This can be compared to the expected flight information for the passenger that is stored in database 74 at the time the boarding pass is issued to ensure that the passenger has boarded the correct aircraft. Further, this expected flight information can be compared to the baggage information (which includes now the aircraft identification information from RFID tag 46) to ensure that the baggage has been loaded on the correct aircraft. In the event that either the baggage or the passenger (or both) have been embarked on the wrong aircraft, an alarm condition may be used to alert airline personnel to take corrective action.

Another function of computer system 70 may be to provide baggage status notification information to passengers, airline personnel and others. To accomplish this goal, the computer system 70 communicates baggage status information via notification system 76. The notification system may include an e-mail system, a wireless paging system, a voice synthesized computer telephony system, computer server system (e.g., for access via the Internet), or any combination of these systems. Passengers, airline personnel and others (e.g., passenger contact persons, third parties shipping cargo, etc.) may thus be notified via e-mail, a call to a telephone, cellular telephone, voicemail box and/or pager number or address, and/or by way of a message to another communication device and/or address of the status of their luggage/packages 52.

The notification message may comprise an independent message announcing the successful loading of baggage (e.g., a "your bags have been loaded" message in voice and/or data form), perhaps along with an indication of the airline/flight number on which the bags have been loaded; an attachment which includes such a message; or the notification message may comprise a computer network address of a location where the message may be accessed. For the latter case, the computer network address is preferably a universal resource locator (URL) associated with a web page at which the message (and possibly related airline flight schedule information) may be accessed. The message may be accessed by allowing the passenger or another individual to view the message, or it may be accessed by allowing an user to down-load the message in one of a number of forms. For example, the message may be down-loaded to a hard copy output device, e.g., a receiving facsimile machine or printer, or it may be down-loaded to a storage medium (e.g., in a personal digital assistant or other device) for later retrieval by the user.

In other embodiments the passenger may view baggage status information through on-board information systems displays. An example of such a display system configured for use in aircraft is described in U.S. Pat. No. 4,975,696 to Salter and Long III, incorporated herein by reference. Briefly, this type of video display system of the aircraft is configured to automatically display aircraft ground speed, outside temperature, and altitude, among other information of interest, as sensed by the aircraft's navigation and air data systems. The system may also be used to display information regarding departure and/or arrival airport information, as appropriate, such as connecting gate information containing times of departure, departure gates, and destination for all outgoing flights.

To this information is now added baggage status information. Passengers can receive, in real time through the video display system, current information regarding the loading of their luggage and be assured that their luggage has made it onboard the correct aircraft.

Figure 7:
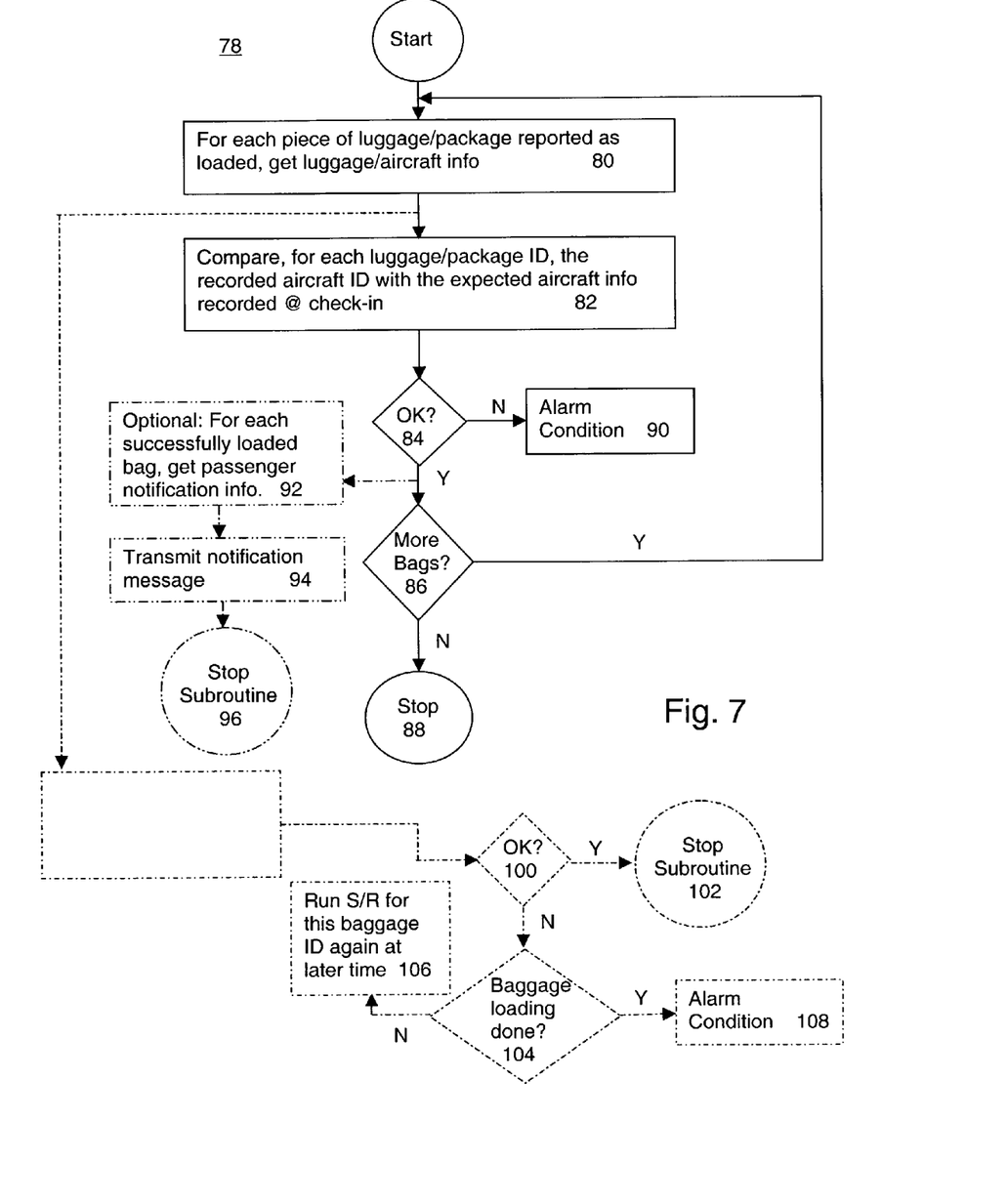
FIG. 7 is a flow chart that illustrates one example of a computer-implemented process, with optional subroutines, for ensuring the reliable loading of baggage on an aircraft in accordance with an embodiment of the present invention.

FIG. 7 is a flowchart illustrating an example of the above-described procedures in further detail. Process 78 begins and at step 80, for each item of luggage or package that has been reported as having been loaded on the aircraft, the computer system performing the processing (which may be computer system 70 or, as indicated above, an RFID interrogator 56 associated with a baggage cart 48) retrieves the corresponding luggage and aircraft identity information from memory (e.g., where it may be stored in the form of a table as shown in FIG. 5). From the above example then, the computer system may retrieve the aircraft ID N-1234 and the luggage ID ABC1234. Then, for the luggage/package item under consideration (e.g., luggage item ABC1234), at step 82, the aircraft identity information (e.g., N-1234) is compared with the expected aircraft information. This expected information may have been stored in the computer system 70 (e.g., in database 74) at the time of check-in (in which case the information is read out of this storage location for comparison purposes) and/or it may have been encoded in the luggage RFID tag 54 (in which case this information can be retrieved from the same table as the recoded aircraft identity information that indicates the actual aircraft on which the luggage item was loaded), In some cases the expected aircraft information may also be passed to the processing computer system through a computer network (e.g., network 72). For example, the expected aircraft information may be passed to the processing computer system (e.g., computer system 70 or interrogator 56) from an associated baggage handling computer system maintained by an airline or the airport baggage handling operations personnel. In still other cases, the expected aircraft information may be manually input or other wise uploaded to the processing computer system (e.g., in a batch data entry process using bar code scanner data from the check-in counters and/or curb-side luggage handlers).

Regardless of how the expected aircraft information is received or provided to the processing computer system, the comparison of expected aircraft information to actual aircraft information (i.e., the aircraft identity of the actual aircraft on which the bags were loaded as received from aircraft identity RFID tag 46 during the loading process) is made at step 82. In some cases, the expected aircraft identity information may be in the form of a flight number while the actual aircraft identity information will be in the form of an aircraft's registration number (e.g., N-1234). Therefore, in such cases, the flight number may need to be converted to an aircraft registration number (or the registration number converted to a flight number) before the comparison is made. This can be done using airline information provided to the processing computer system that correlates aircraft flight numbers to actual aircraft registration numbers.

At step 84 the results of the comparison process are checked. That is, a determination is made as to whether the expected aircraft identity information (as corrected for flight number/registration number if necessary) corresponds to the actual aircraft identity information for the luggage item. If the comparison reveals that the luggage item was loaded on the correct aircraft (i.e., if the expected aircraft information matches the actual aircraft information from the RFID tag 46), then a successful baggage loading has occurred and the process continues for further luggage items (step 86) if there are any, or, if there are none, quits (step 88).

If at any time during this process, the comparison at step 82 reveals that a luggage item has been placed onboard the wrong aircraft (i.e., if the expected aircraft information does not match the actual aircraft information), then an alarm condition is triggered (step 90). The alarm condition may involve notifying baggage handlers to remove the improperly loaded baggage item (which may be identified using hand-geld RFID scanners and identifying the luggage item by its RFID identifying information, for example). Indeed, where the expected aircraft information is encoded in the luggage RFID tag 54, this entire process can be carried out at the baggage cart 48 as the baggage is actually being loaded. Thus, upon an alarm indication (step 90), the luggage item currently being scanned need not even be loaded at all as it is intended for another aircraft.

Several optional subroutines for process 78 are also shown in FIG. 7. One such optional subroutine involves the passenger (or other) notification process discussed above. At optional step 92, the notification subroutine retrieves the passenger notification information for a successfully loaded luggage item from the stored information received from the luggage RFID tag 54. As indicated above, this information may be a wireless (e.g., cellular) telephone or pager number, another telephone number or some other contact information (e.g., an e-mail address) to which the notification message is to be transmitted.

Using this information, at step 94 the notification message confirming successful luggage loading on the correct aircraft is transmitted to the notification address and/or to the aircraft's on-board information system. The passenger (or other person, such as an airline official, a person that designated a package for transport on the aircraft, a third-party logistics company, or other individual or company) is thus notified of successful baggage loading. Upon transmission of the message, the subroutine quits (step 96).

Another optional subroutine deals with correlating passenger boarding information and baggage loading information. At optional step 98, this subroutine compares the baggage identification information from the RFID tag 54 with passenger boarding information. The passenger boarding information may be retrieved from database 74 or it may be received through network 72 (e.g., from a computer system that is coupled to an electronic boarding pass scanner, for example. In other cases, the information may be downloaded as needed from a remote source such as a server or other information source.

Regardless of how the information regarding passenger boarding is received, the comparison is performed to determine if the passenger corresponding to the luggage ID (e.g., ABC1234) has boarded the same aircraft on which the luggage has been loaded. If the results of the comparison indicate that the passenger and baggage item are on board the same (and correct) aircraft, a determination made at step 100, then the subroutine quits at step 102. If however, the comparison reveals that the passenger has not yet boarded, a check is made (at step 104) to determine if the boarding process for the aircraft is complete.

If the boarding process is not yet complete (e.g., as indicated by a boarding complete indication in memory or otherwise), then the comparison for this particular luggage item is mad again at a later time (step 106). This is done until the boarding process is complete. If at that time the passenger still has not boarded, an alarm condition is generated (step 108). The result of the alarm condition may be that the passenger is paged for immediate boarding and/or that the luggage item is removed. In the case of unaccompanied packages being transported, this subroutine would not be run.

Earlier it was noted that the notification messages may go to persons other than passengers. For example, the notification messages may go to airline personnel to confirm the loading/unloading process. In addition, notification messages may go to shippers and/or intended recipients of packages. Thus, shippers may be notified (e.g., using any of the above-described processes) of the successful loading of materials onto a vehicle and intended recipients may be notified of the successful unloading of those materials. The notification messages delivered to the intended recipients may include an indication of when and/or where the materials may be pick-up and if scanning is done at the time of pick-up, a further notification message to the original shipper confirming delivery to the intended recipient may also be delivered. Any or all of these types of notification messages may be delivered by wireless telephone, pager, e-mail, facsimile, etc., or may be available at a web site accessed through a log on procedure that verifies the person seeking information is entitled to receive it.

Figure 8:
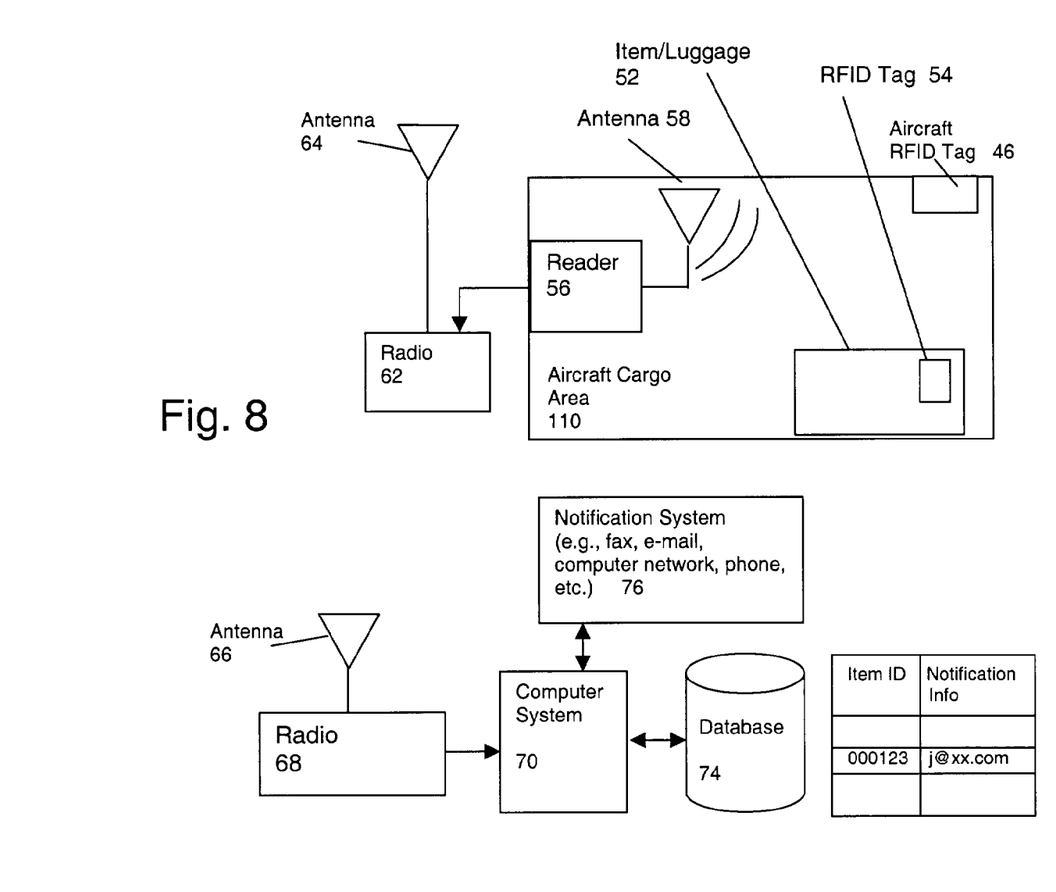
FIG. 8 illustrates an embodiment of the present invention where the RFID reader is included onboard the aircraft being loaded/unloaded.

To this point, the discussion has indicated that the RFID reader is used outside of the aircraft itself. However, in an alternative embodiment, the reader and/or one or more antennas may be placed inside the aircraft for use during the loading and unloading processes. Such an embodiment is illustrated in FIG. 8. As before, the system includes an RFID interrogator system having a reader 56 and one or more antennas 58 coupled to the reader. The interrogator system is configured to receive item identification information from RFID tags 54 (active and/or passive) associated with various items (e.g., boxes, luggage and other items) 52 within the aircraft cargo area 110. This cargo area 110 has one or more RFID reader antennas 58 positioned within it so that when energized, the antenna(s) create an electromagnetic field within the cargo area to interrogate the RFID tags 54 and/or the aircraft RFID tag 46.

The antenna(s)54 is/are associated and connected to an RFID reader 56 in the conventional fashion and, indeed, all of these components may be conventional RFID components. The reader 56 may be included inside the cargo area 110 or may be located elsewhere (e.g., within the aircraft or even externally). In some cases, the reader 56 and antenna(s) 58 will be modified to make use of multipath signals which may be present within the enclosure defined by cargo area 110. That is, the reader 56 may include a hardware or software module to discriminate between multiple reads of the same tag 54 which may be due to multipath signal transmissions. In addition, the antenna(s) 58 may be highly directional in nature so as to reject signals which are incident upon the antennas from the rear.

In some cases, one or more antennas 58 may be positioned near access points to cargo area 110, such as doors and other openings. In this way, tags 54 associated with items 52 that are being loaded into and/or removed from aircraft may be read as they are being loaded/removed. By comparing the new tag information to previously stored information from tags associated with items that were already associated with items that were on-board the aircraft, lists of newly added or removed items may be generated.

The item identification information read from tags 54 may include any desired information, such as an item identification number and/or information regarding the item (e.g., embarkation and/or debarkation points, shipper information, recipient information, contents information (e.g., bill of lading), customs information (e.g., value, contents, etc.), weight, package dimensions, etc). In addition, as discussed above, the item identification information may include a notification address. The RFID tags 54 may be active or passive tags and the reading of the item identification information (which is pre-stored in the tag memory) takes place in the conventional fashion. Thus, for passive tags, when the RFID tag 54 is within an electromagnetic field created by one or more of the antennas 58, the tag is activated and the item identification information is transmitted to the reader 56 in the conventional fashion.

From the reader 56, the item identification information may be transferred to computer system 70 (which may be a conventional personal computer configured with software to perform the processes described herein) across a communications link (which may be a wireless communication link Thus, associated with reader 56 is a radio 62. This radio may be a transmitter or a transceiver adapted for analog or digital communication. In some cases, the radio 62 will be included in the aircraft, while in other cases the radio 62 may be included in a separate vehicle that is used to assist in the loading/unloading of the aircraft. Regardless of the configuration, however, the radio 62 may be used to transmit the item identification information received from the RFID tags 54 and via an associated antenna 64, to computer system 70.

To accommodate this transfer of information, the item identification information from tags 54 and/or the aircraft identification information from tag(s) 46 will be used to modulate a carrier signal from radio 62, which will subsequently be demodulated by radio 64 to extract the item and/or aircraft identification information once again. This information may then used to update one or more databases 74 as discussed above. The exact make up of these various communication components is not critical to the present invention.

Database 74 may be a designated portion of any computer readable storage medium, such as a hard disk drive, a floppy disk, or other storage medium. The item identification information (e.g., a serial number 000123) may be stored in a variety of fashions, for example as entries in one or more tables, which are used to associate item identification information with notification information, and/or an inventory table which may provide such information as which aircraft the item is located in, where the aircraft is located, etc. The association of item with aircraft may be made using the information from aircraft RFID tag 46, which is also located within cargo area 110 and is read by reader 56 during a scan.

In addition to maintaining such records and tables, after the computer system 70 receives the item identification information, a notification message indicating the status of the item (e.g., the aircraft in which it is located along with expected departure/arrival times and locations, etc.) may be transmitted, for example to a passenger, an airline representative, a shipper of the item and/or an individual awaiting receipt of the item. The notification message may be transmitted as any or all of: a facsimile message, a telephone message, a pager message, a voice synthesized message, an e-mail message, or an electronic message. Preferably, the notification message is automatically transmitted by the computer system 70, and may include at least a portion of the item identification information.

In general, the notification message will be transmitted to a notification address associated with the item identification information. This notification address may be a telephone number, a facsimile number, a pager number, an e-mail address, or a computer system address (e.g., a network or Internet address, etc.). The notification address may be obtained, using the item identification information, from a table stored in a computer readable medium, or, in some cases, from the RFID tag 54 itself during the scanning operation. That is, the item identification information may include the notification address to which the notification message is to be transmitted.

The computer system 70 may be coupled to a notification system 76, which is used to transmit the notification message. Notification system 76 may be a conventional computer modem (internal or external) or computer network interface card to facilitate transmissions of e-mail, facsimile, pager, telephone or electronic messages. In the case of telephone messages, the notification system 76 will be equipped with a conventional voice synthesizer to facilitate reproduction of audible sounds. In some cases, the notification system 76 will connect computer system 70 to the Internet to allow for notification messages to be passed via that medium, however, this is not critical to the present invention. In general, the supplier of item 52 can choose the type of notification message to be received and, hence, will have selected the notification means used by computer system 70. When a notification message is transmitted, inventory tables and other records may be updated to reflect the fact that an associated item is in transit or ready for pick-up, etc. (e.g., depending on the location and status of the aircraft).

Thus a scheme for ensuring the reliable loading of baggage and other materials on aircraft and other vehicles has been described. Although discussed with reference to several illustrated embodiments, it bears repeating that these have merely been examples of the application of the present invention. Other embodiments of the present invention also exist and are intended to be covered hereby. For example, although discussed primarily with respect to the baggage loading operations, the present invention finds equal applicability to the baggage unloading operations as well. In such cases, baggage and aircraft identity information is scanned as the luggage is unloaded, and this information can then be relayed to passengers waiting in a baggage claim area or other location in the manner discussed above. In addition, where the vehicle is being loaded/unloaded by hand, the scanner need not be associated with a baggage cart. Instead, the scanner may be a hand-held or portable unit that is used to manually scan the baggage and vehicle RFID tags and the information from those tags later associated (e.g., in one or more tables in memory) for computer access. Thus, the full scope present invention should only be measured in terms of the claims, which follow.

What is claimed is:

1. A system, comprising a radio frequency identification (RFID) system having one or more antennas coupled to an interrogator associated with a baggage loading/unloading device, at least a first one of the antennas being located at a position on the loading/unloading device so that when an item is being loaded to or unloaded from an adjacent vehicle the first antenna is capable of detecting information transmitted from at least one of one or more identity RFID tags located on the adjacent vehicle being loaded or unloaded, or information transmitted from a baggage RFID tag located on the item being loaded on or unloaded from the adjacent vehicle.

2. The system of claim 1, wherein at least a second one of the antennas is positioned on the loading/unloading device so that when the item is being loaded or unloaded from the adjacent vehicle the second antenna is capable of detecting information transmitted from the baggage RFID tag located on the item being loaded on or unloaded from the adjacent vehicle.

3. The system of claim 2 wherein the first and second antennas comprise the same antenna.

4. The system of claim 3 wherein at least one of the one or more identity RFID tags located on the adjacent vehicle is a passive RFID tag.

5. The system of claim 3 wherein the baggage RFID tag located on the item being loaded on or unloaded from the vehicle is a passive RFID tag.

6. The system of claim 2 further comprising a computer system coupled to receive and store the information transmitted from the identity RFID tag located on the vehicle together with the information transmitted from the baggage RFID tag in a computer-readable medium.

7. The system of claim 6 wherein the computer system is coupled to receive the information transmitted from the identity RFID tag located on the adjacent vehicle together with the information transmitted from the baggage RFID tag via a wireless communication link.

8. The system of claim 6 wherein the computer system is associated with the interrogator.

9. The system of claim 6 wherein the computer system is configured to compare, the information transmitted from the identity RFID tag with expected vehicle information for the item loaded on or unloaded from the adjacent vehicle.

10. The system of claim 9 wherein the computer system is further configured to generate an alarm condition if the results of the comparison indicate that the item is loaded on a vehicle other than that which was expected.

11. The system of claim 10 wherein expected vehicle information is received from the baggage RFID tag located on the item.

12. The system of claim 10 wherein the expected vehicle information is received from a database accessible to the computer system.

13. The system of claim 10 wherein the expected vehicle information is stored at the time when the item is received during a check-in procedure.

14. The system of claim 9 wherein the computer system is further configured to notify a designated party of successful loading or unloading of the item on/from the adjacent vehicle if the expected vehicle information matches the information transmitted from the identity RFID tag.

15. The system of claim 14 wherein the computer system is configured to make the notification using notification information received from the baggage RFID tag.

16. The system of claim 14 wherein the notification information comprises at least one of: a telephone number, a pager number, or an e-mail address.

17. The system of claim 14 wherein the designated party comprises a passenger.

18. The system of claim 14 wherein the computer system is further configured to provide information regarding successful loading of the item on the adjacent vehicle to an onboard information system of the adjacent vehicle.

19. The system of claim 18 wherein the adjacent vehicle comprises an aircraft.

20. The system of claim 19 wherein the item comprises one or more universal loading device containers.

21. The system of claim 14 wherein the computer system is further configured to compare passenger boarding information with the information received from the baggage RFID tag.

22. The system of claim 21 wherein the computer system is further configured to generate an alarm condition if the passenger boarding information reveals that a passenger associated with the item has not boarded the adjacent vehicle prior to the expiration of an allocated boarding period.

23. A computer-implemented method, comprising comparing for an item loaded on/unloaded from a vehicle, identity information received from an RFID tag affixed to the vehicle with expected vehicle information indicating the vehicle on/from which the item was to have been loaded/unloaded and generating an alarm condition or not, according to the outcome of the comparison.

24. The computer-implemented method of claim 22 wherein the RFID tag affixed to the vehicle comprises a passive RFID tag.

25. The computer-implemented method of claim 23 wherein the identity information comprises one or more of: vehicle registration information, or vehicle flight number information.

26. The computer-implemented method of claim 23 wherein the vehicle comprises an aircraft.

27. The computer-implemented method of claim 23 wherein the expected vehicle information is received from a baggage RFID tag affixed to the item.

28. The computer-implemented method of claim 23 wherein the expected vehicle information was stored at the time the item was checked-in.

29. The computer-implemented method of claim 28 wherein the item comprises luggage to be loaded on an aircraft.

30. The computer-implemented method of claim 28 wherein the item comprises a universal loading device container to be loaded on an aircraft.

31. The computer-implemented method of claim 28 wherein the expected vehicle information was stored in a baggage RFID tag affixed to the luggage.

32. The computer-implemented method of claim 31 wherein the baggage RFID tag also stores passenger notification information.

33. The computer-implemented method of claim 32 wherein the passenger notification information comprises one or more of a telephone number, a pager number or an e-mail address.

34. The computer-implemented method of claim 33 further comprising transmitting a notification message to a location identified by the passenger notification information upon a successful match between the expected vehicle information and the information received from the RFID tag affixed to the vehicle.

35. The computer-implemented method of claim 23 further comprising generating a second alarm condition if a passenger associated with the item has not boarded the vehicle within a boarding time period.

36. A baggage cart comprising a conveyor belt and an antenna configured for use with an RFID system affixed to the baggage cart in an area near one end of the conveyor belt and situated so as to be capable of scanning RFID tags affixed to vehicles from which baggage will be loaded or unloaded using the baggage cart.

37. The baggage cart of claim 36 further comprising an RFID interrogator coupled to the antenna.

38. The baggage cart of claim 37 further comprising a radio system coupled to the interrogator.

39. The baggage cart of claim 37 wherein the interrogator comprises an RFID programmer.

40. A method comprising:
scanning a first RFID tag associated with a vehicle to obtain vehicle identification information;
scanning a second RFID tag associated with a item being loaded onto or unloaded from the vehicle to obtain item information; and
associating the vehicle identification information with the item information in a computer accessible record.

41. The method of claim 40 further comprising transmitting a notification message to a contact address upon successful loading or unloading of the item.

42. The method of claim 41 wherein the contact address is included in the item information.

43. The method of claim 42 wherein the contact address comprises at least one of: a telephone number, a pager number, a facsimile number, an e-mail address, or a web site address.

44. The method of claim 42 wherein the contact address is associated with someone other than a passenger on the vehicle.

45. The method of claim 40 wherein the vehicle comprises one of: a ship, an aircraft, a train, an automobile, a truck, a container or a building involved in a shipping process for the item.

46. The method of claim 40 wherein the item comprises one of: a piece of luggage, a container, a universal loading device container or a package.

47. The method of claim 40 wherein the scanning comprises using one of: an antenna mounted to a baggage cart, or a hand-held scanner.

* * * * *